United States Patent [19]

Sattlegger et al.

[11] 4,357,438

[45] Nov. 2, 1982

[54] COATABLE WATER-SETTING PLASTIC ORGANOPOLYSILOXANE MOLDING COMPOSITIONS

[75] Inventors: Hans Sattlegger, Odenthal; Karl Schnurrbusch, Leverkusen; Manfred Boll, Burscheid; Hans Friemann, Cologne, all of Fed. Rep. of Germany

[73] Assignee: Bayer Aktiengesellschaft, Leverkusen, Fed. Rep. of Germany

[21] Appl. No.: 272,872

[22] Filed: Jun. 12, 1981

[30] Foreign Application Priority Data

Jul. 4, 1980 [DE] Fed. Rep. of Germany ....... 3025376

[51] Int. Cl.$^3$ ................................................. C08K 5/01
[52] U.S. Cl. .................................... 524/490; 427/387; 428/448; 528/12; 528/33; 528/34; 528/901
[58] Field of Search ..................... 528/34, 33, 901, 12; 427/387; 428/448; 524/490

[56] References Cited

U.S. PATENT DOCUMENTS 3,364,160  1/1968  Golitz et al. ............................ 528/34
3,378,520  4/1968  Sattlegger et al. .................... 528/34
3,417,047  12/1968  Golitz et al. ........................... 528/34

FOREIGN PATENT DOCUMENTS 1247646  8/1967  Fed. Rep. of Germany .
1258087  1/1968  Fed. Rep. of Germany .

*Primary Examiner*—Melvyn I. Marquis
*Attorney, Agent, or Firm*—Sprung, Horn, Kramer & Woods

[57] ABSTRACT

In a plastic organopolysiloxane molding composition which can be stored in the absence of water and which changes into an elastomeric molding or coating under the effect of water or air, obtained by mixing an $\alpha,\omega$-dihydroxy polydiorgano siloxane with a carboxylic acid amidoalkyl alkoxy silicon compound as a crosslinking agent and a complex titanic acid ester and optionally with a filler, pigment and/or heavy metal salt known to accelerate the crosslinking reaction, the improvement which comprises including in the mixture about 0.2 to 15% by weight, based on the mixture as a whole, of a branched and/or cyclic paraffin hydrocarbon containing from 6 to 24 carbon atoms, whereby the resulting material after hardening can form a strongly adherent bond with a lacquer applied thereto.

5 Claims, No Drawings

COATABLE WATER-SETTING PLASTIC ORGANOPOLYSILOXANE MOLDING COMPOSITIONS

This invention relates to moldable mixtures of organopolysiloxanes and crosslinking agents which change into an elastomeric state on the presence of water or water vapor at temperatures below 50° C. and which may readily be coated.

Mixtures of this type, which are also known as RTV one-component compositions, are mainly used as gap-filling and sealing compounds in the building industry, in sanitary installations and in aquarium construction. They all contain as their principal constituent an $\alpha,\omega$-dihydroxy polydiorganosiloxane optionally mixed with a filler. Storable reaction mixtures are obtained if this $\alpha,\omega$-dihydroxy polydiorganosiloxane is mixed with a silicon compound containing more than two reactive groups which is capable of reacting both with silanol groups and also with water and providing moisture is kept completely away. These reaction mixtures, on exposure to air, change into an elastomeric crosslinked product through their water vapor content. RTV one-component systems such as these have been known per se for some time. Very good results have been obtained with so-called "neutral" gap-filling compounds (cf. for example German Pat. No. 1,247,646 and German Pat. No. 1,258,087) in which carboxylic acid amidoalkyl alkoxy silanes are used as crosslinking agents. The fact that these compounds could not be effectively coated, i.e. would not take lacquers, was a disadvantage for numerous applications, particularly in the sealing of windows and gaps between concrete walls, and also in many other applications.

Numerous efforts and attempts have been made to improve the ability of one-component compositions to take coatings, i.e. to improve lacquer adhesion. For example, attempts have been made to enable the sealing compounds to be coated by introducing additives such as acicular calcium carbonate or certain solvents. However, the resulting products have altogether different mechanical properties (high modulus, low breaking elongation, high Shore-A-hardness, large change in volume after hardening), so that they are no longer able to satisfy the necessary requirements in terms of quality. (Comparison product I Table 1)

It has now been found that these disadvantages can be avoided without affecting the other advantageous properties by introducing certain additives into organopolysiloxane compositions.

Accordingly, the present invention relates to plastic organopolysiloxane molding compositions which can be stored in the absence of water and which change into elastomeric moldings, or coatings under the effect of water or air at temperatures as low as room temperature, produced by mixing $\alpha,\omega$-dihydroxy polydiorganopolysiloxanes with carboxylic acid amidoalkyl alkoxy silicon compounds as crosslinking agents and complex titanic acid esters and, optionally, with fillers, pigments and heavy metal salts which are known to accelerate crosslinking, the molding compositions according to the invention being characterized in that the mixture contains about 0.2 to 15% by weight, based on the total mixture, of branched or cyclic paraffin hydrocarbons containing from 6 to 24 carbon atoms.

It has surprisingly been found that additives of the type mentioned above introduced to the one-component systems enable lacquers to be applied with firm adhesion and provide a good surface finish.

The quantitative ratios between the components of the mixture correspond to those of known compositions. It is preferred to use a mixture which, for 100 parts by weight of $\alpha,\omega$-dihydroxy polydiorganosiloxane having a viscosity of about 1000 to 500,000 cP and more particularly about 10,000 to 60,000 cP at 20° C., contains about 3 to 20 parts of a complex titanic acid ester, about 10 to 150 parts by weight of a filler, about 3 to 20 parts by weight of the crosslinking agent and, optionally, about 0.1 to 3.0 parts by weight of a heavy metal compound as catalyst. Suitable crosslinking agents are carboxylic acid amino alkyl alkoxy silicon compounds, for example, di-N-methyl-benzamido methyl ethoxy silane, di-N-methyl-benzamido methyl methoxy silane, di-N-methyl-propylamido methyl ethoxy silane, mono-N-methylpropylamino methyl diethoxy silane, di-N-methyl-propylamido methyl methoxy silane, di-N-methyl-caprolactam methyl ethoxy silane and di-N-methyl-caprolactam methyl methoxy silane.

Preferred fillers are fillers with a reinforcing effect, such as colloidally disperse silica, although it is also possible to use fillers with hardly any strengthening effect, such as quartz powder, diatomaceous earth or zinc oxide and chalk.

Additives particularly suitable for use in accordance with the invention are branched or cyclic paraffin hydrocarbons containing from 6 to 24 carbon atoms, for example, isohexane, iso-octane, iso-hexadecane, isododecane, iso-octadecane/cyclohexane.

The one-component systems according to the invention are suitable in principle for any applications where an affinity for coatings is required. Systems of the type in questions are used with particular preference in the pointing of windows, facades and in the do-it-yourself sector. The affinity for coatings and lacquers applies to any suitable lacquers in the fields of application mentioned and particularly to standard commercial lacquers based on alkyd resins (undercoat and topcoat lacquers), to dispersion paints based on mixtures of (depending on the application) acrylate, styrene, polyvinyl acetate and polyvinyl propionates.

Depending on the layer thickness of the sealing compound, the undercoat may be applied after 1 to 3 days, followed by lacquering in the usual way.

The molding compositions according to the invention are produced from the components of the mixture in known manner, the largely anhydrous, non-crosslinking components generally initially being mixed together after which the crosslinking agent is added and, finally, the total mixture is degassed at room temperature.

The invention is illustrated by the following examples:

EXAMPLE 1

(Comparison II)

A mixture of 66.2 parts by weight of $\alpha,\omega$-dihydroxy polydimethyl siloxane having a viscosity of 50,000 cP and 4.5 parts by weight of di-i-butoxy titanium diacetoacetic ester chelate is initially introduced. 20.0 parts by weight of chalk, 1.0 part by weight of titanium dioxide and 3.5 parts by weight of a finely disperse silica obtained by flame hydrolysis (BET-surface 130 m$^2$/g) are then introduced with stirring at room temperature until the mixture is homogeneous (approximately 20 to 30 minutes), followed by evacuation for about 5 minutes.

0.7 Part by weight of an organo tin compound is then added. Stirring time approximately 5 minutes. Finally, 4.0 parts by weight of di-N-methyl-benzyamido methyl ethoxy silane are then introduced with stirring, followed by evacuation for about 15 minutes.

Cartridges are then filled with the composition and sealed. The composition can be stored in the absence of moisture for at least 6 months without any adverse effect upon its properties when it comes to application.

Mechanical properties (both before and after storage): E-modulus 100%—approx. 0.3 N/mm$^2$, tensile strength—approx. 0.7 N/mm$^2$, breaking elongation—approx. 550%, Shore-A-hardness—approx. 22, density—approx. 1.27 g/cc.

EXAMPLE 2

A mixture of 45.3 parts by weight of α,ω-di-hydroxy polydimethyl siloxane having a viscosity of 50,000 cP and 4.5 parts by weight of di-i-butoxy titanium diacetoacetic ester chelate is initially introduced. 40.0 parts by weight of chalk, 1.0 part by weight of titanium dioxide and 4.5 parts by weight of a finely disperse silica obtained by flame hydrolysis are then stirred in, introduced with stirring at room temperature until the mixture is homogeneous (approximately 20 to 30 minutes), followed by evacuation for about 5 minutes. 0.7 part by weight of an organo tin compound dissolved in 1.0 part by weight of an iso-octadecane is then added with stirring over a period of about 5 minutes. Finally, 4.0 parts by weight of di-N-methyl-benzamido methyl ethoxy silane are then introduced with stirring, followed by evacuation for about 15 minutes.

Cartridges are filled with the composition and sealed. The composition can be stored in the absence of moisture for at least 6 months without any adverse effect upon its properties when it comes to application.

Mechanical properties (both before and after storage): E-modulus 100%—approx. 0.5 N/mm$^2$, tensile strength—approx. 0.7 N/mm$^2$, breaking elongation—approx. 330%, Shore-A-hardness—approx. 40, density—approx. 1.4 g/cc.

EXAMPLE 3

A mixture of 56.3 parts by weight of α,ω-dihydroxy polydimethyl siloxane having a viscosity of 50,000 cP and 45 parts by weight of di-i-butoxy titanium diacetoacetic ester chelate is initially introduced. 25 parts by weight of chalk, 1.0 part by weight of titanium dioxide and 8.0 parts by weight of a finely disperse silica obtained by flame hydrolysis are then introduced with stirring at room temperature until the mixture is homogeneous (approximately 20 to 30 minutes), followed by evacuation for 5 minutes. 0.7 part by weight of an organo tin compound dissolved in 5.0 parts by weight of isododecane is then added (stirring time approximately 5 minutes). Finally, 4.0 parts by weight of di-N-methyl-benzamido methyl ethoxy silane are introduced with stirring, followed by evacuation for about 15 minutes. Cartridges are filled with the composition and sealed. The composition can be stored in the absence of moisture for at least 6 months without any adverse effect upon its properties when it comes to application.

Mechanical properties (both before and after storage); E-modulus 100%—approx. 0.4 N/mm$^2$, tensile strength—approx. 1.0 N/mm$^2$, breaking elongation—approx. 530%, Shore-A-hardness—approx. 40, density—approx. 1.22 g/cc.

EXAMPLE 4

A mixture of 44.3 parts by weight of α,ω-dihydroxy polydimethyl siloxane having a viscosity of 50,000 cP and 4.5 parts by weight of di-i-butoxy titanium diacetoacetic ester chelate is initially introduced. 40.0 parts by weight of chalk, 1.0 part by weight of titanium dioxide and 4.5 parts by weight of a finely disperse silica obtained by flame hydrolysis are then introduced with stirring in at room temperature until the mixture is homogeneous (approximately 20 to 30 minutes), followed by evacuation for about 5 minutes. 0.7 parts by weight of an organo tin compound dissolved in 1.0 part by weight of an isododecane is then added (stirring time approximately 5 minutes). Finally, 4.0 parts by weight of di-N-methyl-benzamido methyl ethoxy silane are introduced with stirring, followed by evacuation for approximately 15 minutes.

Cartridges are filled with the composition and sealed. The composition can be stored in the absence of moisture for at least 6 months without any adverse effect upon its properties when it comes to application.

Mechanical properties (both before and also after storage): E-modulus 100%—approx. 0.4 N/mm$^2$, tensile strength—approx. 0.6 N/mm$^2$, breaking elongation—approx. 330%, Shore-A-hardness—approx. 40, density—approx. 1.4 g/cc.

EXAMPLE 5

A mixture of 44.3 parts by weight of α,ω-dihydroxy polydimethyl siloxane and 4.5 parts by weight of di-i-butoxy titanium diacetoacetic ester chelate is initially introduced. 40.0 parts by weight of chalk, 1.0 part by weight of titanium dioxide and 4.5 parts by weight of a finely disperse silica obtained by flame hydrolysis are then introduced with stirring at room temperature until the mixture is homogeneous (approximately 20 to 30 minutes), followed by evacuation for about 5 minutes. 0.7 part by weight of an organo tin compound dissolved in 1.0 part by weight of an iso-octane is then added (stirring time approximately 5 minutes). Finally, 4.0 parts by weight of di-N-methyl-benzamido methyl ethoxy silane are introduced with stirring, followed by evacuation for about 15 minutes.

Cartridges are filled with the composition and sealed. The composition can be stored in the absence of moisture for at least 6 months without any adverse effect upon its properties when it comes to application.

Mechanical properties (both before and after storage): E-modulus 100%—approx. 0.4 N/mm$^2$, tensile strength—approx. 0.6 N/mm$^2$, breaking elongation—approx. 330%, Shore-A-hardness—approx. 40, density—approx. 1.4 g/cc.

TABLE I

Comparison of chemically neutral systems in regard to lacquer adhesion and surface finish.

| | Lacquer adhesion (Boeing Test according to ASTM D 3359-70) | | Surface finish | |
|---|---|---|---|---|
| | *alkyd resin basis | dispersion basis | *alkyd resin basis | dispersion basis |
| Example 1 | none | none | good | good |
| Example 2 | good | good | good | good |
| Example 3 | good | good | good | good |
| Example 4 | good | satisfactory | good | good |
| Example 5 | satis- | satis- | good | good |

TABLE I-continued

Comparison of chemically neutral systems in regard
to lacquer adhesion and surface finish.

| | Lacquer adhesion (Boeing Test according to ASTM D 3359-70) | | Surface finish | |
|---|---|---|---|---|
| | *alkyd resin basis | dispersion basis | *alkyd resin basis | dispersion basis |
| Comparison prod. I in instant specification | factory none | factory — | good | — |

*A lacquer based on an alkyl resin was applied in accordance with the procedure described hereinabove preceding the examples.

TABLE II

Comparison of mechanical properties.

| | E-modulus Din 53 504 | Shore A DIN 53 505 | Weight loss % 23° C. |
|---|---|---|---|
| Example 1 approx. | 0.3 | 22 | 1.0 |
| Example 2 approx. | 0.5 | 40 | 1.0 |
| Example 3 approx. | 0.4 | 40 | 3.8 |
| Example 4 approx. | 0.4 | 40 | 1.0 |
| Example 5 approx. | 0.4 | 40 | 1.0 |
| Comparison product I in instant specification approx. | 0.9 | 65 | 22.0 |

| | Weight loss % 70° C. | Density g/cc |
|---|---|---|
| Example 1 approx. | 6.8 | 1.27 |
| Example 2 approx. | 8.7 | 1.39 |
| Example 3 approx. | 9.4 | 1.22 |
| Example 4 approx. | 8.0 | 1.40 |
| Example 5 approx. | 7.8 | 1.40 |
| Comparison product I | | |

TABLE II-continued

Comparison of mechanical properties.

| | | |
|---|---|---|
| of p.2/3 approx. | 24.0 | 1.23 |

It will be appreciated that the instant specification and examples are set forth by way of illustration and not limitation, and that various modifications and changes may be made without departing from the spirit and scope of the present invention.

We claim:

1. In a plastic organopolysiloxane molding composition which can be stored in the absence of water and which changes into an elastomeric molding or coating under the effect of water or air, obtained by mixing an $\alpha,\omega$-dihydroxy polydiorgano siloxane with a carboxylic acid amidoalkyl alkoxy silicon compound as a crosslinking agent and a titanic acid ester complex and optionally with a filler, pigment and/or heavy metal salt known to accelerate the crosslinking reaction, the improvement which comprises including in the mixture about 0.2 to 15% by weight, based on the mixture as a whole, of a branched and/or cyclic paraffin hydrocarbon containing from 6 to 24 carbon atoms, whereby the resulting material after hardening can form a strongly adherent bond with a lacquer applied thereto.

2. An organopolysiloxane molding composition according to claim 1, wherein the paraffin hydrocarbon comprises at least one of cyclohexane, isohexane, isooctane, isohexadecane, isododecane and/or iso-octadecane.

3. An organopolysiloxane molding composition according to claim 1, wherein the crosslinking agent comprises di-N-methyl-benzamido methyl ethoxy silane.

4. An elastomeric molding or coating produced by exposing to water or air a composition according to claim 1.

5. An elastomeric molding or coating according to claim 4 carrying a lacquer coating thereon.

* * * * *

UNITED STATES PATENT AND TRADEMARK OFFICE
CERTIFICATE OF CORRECTION

PATENT NO. : 4,357,438
DATED : November 2, 1982
INVENTOR(S) : Hans Sattlegger et al It is certified that error appears in the above—identified patent and that said Letters Patent is hereby corrected as shown below:

Col. 6, line 3  Delete "of p. 2/3" and insert --in instant specification--

Signed and Sealed this

Fifteenth Day of March 1983

[SEAL]

Attest:

GERALD J. MOSSINGHOFF

Attesting Officer   Commissioner of Patents and Trademarks